US008345256B2

(12) United States Patent
Cansot et al.

(10) Patent No.: US 8,345,256 B2
(45) Date of Patent: Jan. 1, 2013

(54) METHOD FOR CALIBRATING INTERPIXEL GAINS OF AN INTERFEROMETER

(75) Inventors: Elodie Cansot, Toulouse (FR); Alain Rosak, Toulouse (FR)

(73) Assignee: Centre National d'Etudes Spatiales (FR)

( * ) Notice: Subject to any disclaimer, the term of this patent is extended or adjusted under 35 U.S.C. 154(b) by 384 days.

(21) Appl. No.: 12/622,622

(22) Filed: Nov. 20, 2009

(65) Prior Publication Data
US 2010/0134800 A1    Jun. 3, 2010

(30) Foreign Application Priority Data
Nov. 20, 2008   (FR) ...................................... 08 57895

(51) Int. Cl.
*G01B 9/02*    (2006.01)
(52) U.S. Cl. ........................................ 356/451; 356/456
(58) Field of Classification Search .................. 356/451, 356/452, 455
See application file for complete search history.

(56) References Cited

U.S. PATENT DOCUMENTS

| 5,675,513 | A | 10/1997 | Hammer |
| 7,446,878 | B2 * | 11/2008 | Ridder et al. ............... 356/451 |
| 2005/0083531 | A1 | 4/2005 | Millerd et al. |

FOREIGN PATENT DOCUMENTS
CN      101144737 A     3/2008

OTHER PUBLICATIONS

J. Schmit, K. Creath: "Extended averaging technique for derivation of error-compensating algorithms in phase-shifting interferometry" Applied Optics, vol. 34, No. 19, (Jul. 1, 1995), pp. 3610-3619, XP002528143.
European Search Report, EP 09176629, dated Dec. 14, 2009.

\* cited by examiner

*Primary Examiner* — Hwa Lee
(74) *Attorney, Agent, or Firm* — Lerner, David, Littenberg, Krumholz & Mentlik, LLP

(57) ABSTRACT

A method is provided to calibrate a detection array used for acquiring an image of an interferogram at an instrument. A first interferogram and at least two shifted interferograms are elaborated at the instrument by creating a number of optical path differences, so at least three samples are on a sine wave portion for each optical path difference. A function coinciding with the sine wave portion is determined by interpolation. A calibration coefficient is determined from the function for each optical path difference.

12 Claims, 1 Drawing Sheet

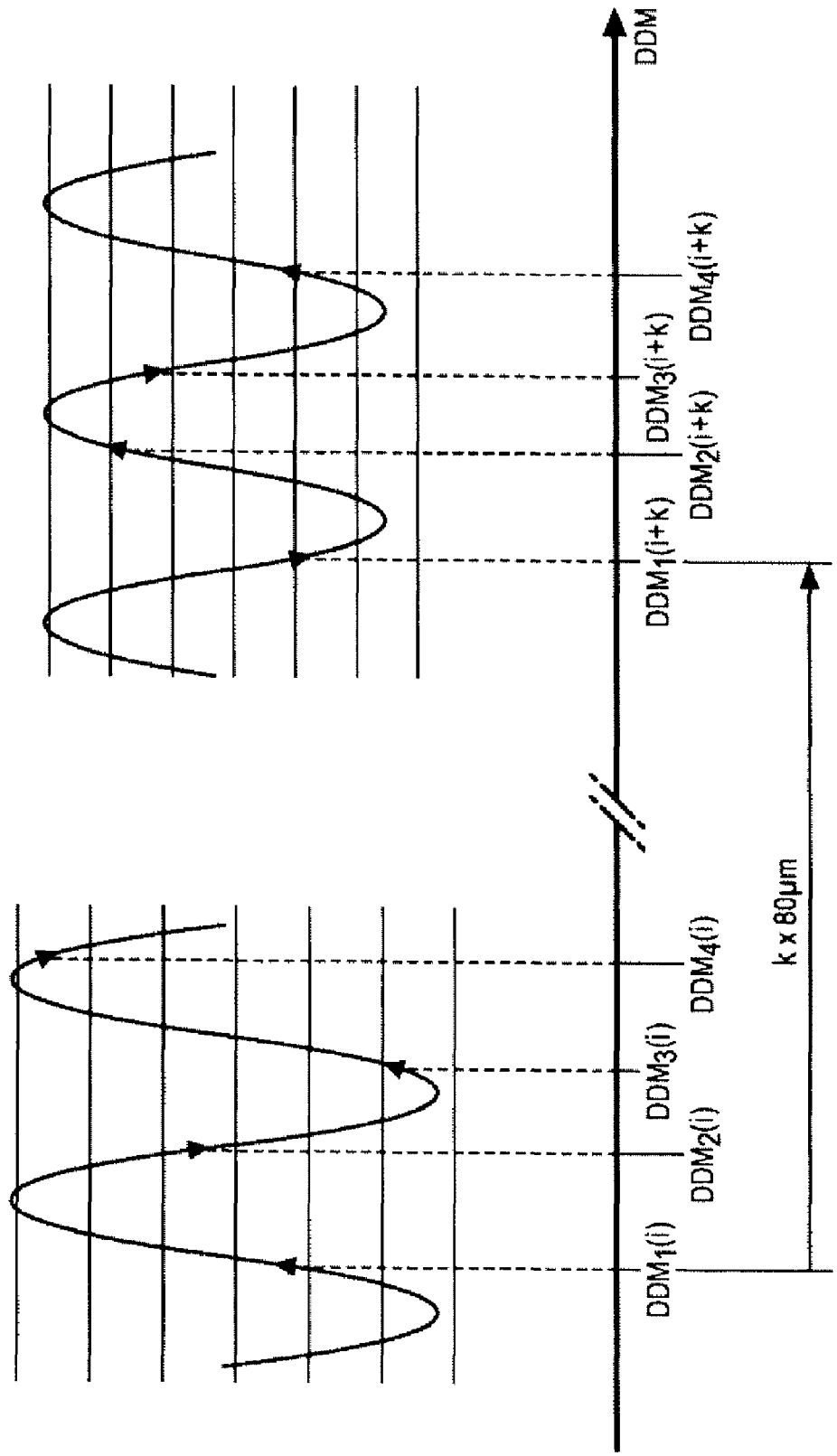

US 8,345,256 B2

METHOD FOR CALIBRATING INTERPIXEL GAINS OF AN INTERFEROMETER

CROSS-REFERENCE TO RELATED APPLICATIONS

The present application claims the benefit of French Patent Application No. 0857895, filed Nov. 20, 2008. The disclosure of said application is incorporated by reference herein.

SUMMARY OF THE INVENTION

A method for calibrating a detection array used for acquiring an image of an interferogram at an instrument. A first interferogram is elaborated by creating a finite number of optical path differences. At least two shifted interferograms are elaborated by shifting each of the optical path differences of the first interferogram. At least three samples are positioned on a sine wave portion. A function coinciding with the sine wave portion is determined by interpolation for each sine wave portion. From the function, a calibration coefficient is determined for each optical path difference.

BRIEF DESCRIPTION OF THE DRAWING

FIG. 1 is an illustrative diagram of interferograms in accordance with the present invention.

DETAILED DESCRIPTION

The field of the invention is that of the calibration of a detection array for correcting gain variations among pixels.

The invention more specifically relates to interferometry and to a method with which the effects of errors caused by gain variations among pixels of the detection array may be reduced in the focal plane of an interferometer, errors which will degrade the accuracy of the measurements conducted by the interferometer.

In static Fourier Transform Spectrometry, the interferometer elaborates an interferogram by creating a finite number of optical path differences distributed spatially, and acquired by a detection method. This may be achieved by means of a multitude of mirrors in parallel called echelettes, and with an optical system imaging these echelettes on an array. This may also be achieved with a slight tilt between both mirrors, the array then carrying out acquisition of the interference fringes generated by this tilt between both mirrors. In all the cases, the detection gains of the detection array vary from one pixel to the other, which induces distortion upon acquiring each element of the interferogram. It is therefore sought to correct the interpixel gain deviation as accurately as possible.

The method used in conventional imaging for calibrating interpixel responses of a detection array consists of sending a uniform (or known) signal on all the pixels of the detection array. This may be done for example by illuminating the instruments with an integrating sphere which then provides uniform illumination.

The response of the pixels of the focal plane should then be uniform. If this is not the case, the required relative gain is calculated for each pixel so that each pixel responds to this uniform illumination in the same way.

But in an interferometer, the input uniform signal emerges modified by interferences. As the signal is no longer spatially uniform, it then becomes difficult to calibrate the detection array at the output of the interferometer. The conventional uniform illumination method is therefore not satisfactory within the scope of interferometry.

There is therefore a need for a method for calibrating gain defects among pixels of a detection array with which interpixel gain deviation may be corrected with accuracy within the scope of an interferometric application.

The invention has the goal of meeting this need, and, for this purpose according to a first aspect, proposes a method for calibrating a detection array used for acquiring an image of an interferogram, comprising the steps according to which:

a first interferogram and at least two shifted interferograms are elaborated, the first interferogram being elaborated by creating a finite number of optical path differences, and the shifted interferograms being elaborated for each of them by shifting each of the optical path differences of the first interferogram, so that for each optical path difference at least three samples positioned on a sine wave portion are available;

a function is determined by interpolation for each sine wave portion, coinciding with the sine wave portion;

a calibration coefficient for an optical path difference is determined from the function coinciding with the sine wave portion corresponding to this optical path difference.

Certain preferred but non-limiting aspects of this method are the following:

the calibration coefficient corresponds to the average of the function;

the function is sinusoidal;

the function corresponds to the product of a sinusoidal function and of a polynomial function;

said at least three samples correspond to regularly spaced-out optical path differences;

said at least three samples correspond to optical path differences spaced out so as to have a total shift larger than one quarter of a wavelength of the spectrum at the input of the instrument elaborating the interferograms;

said at least three samples correspond to optical path differences spaced out so as to have a total shift of one wavelength of the spectrum at the input of the instrument;

three shifted interferograms are elaborated;

a mobile component of the measuring instrument is displaced in order to elaborate a shifted interferogram;

the mobile component is mounted on a piezoelectric mechanism;

the spectrum at the input of the instrument elaborating the interferograms has a narrow band.

According to a second aspect, the invention relates to a measuring instrument comprising a detection array in order to acquire an image of an interferogram calibrated in accordance with the method according to the first aspect of the invention.

Other aspects, objects and advantages of the present invention will become better apparent upon reading the following detailed description of preferred embodiments thereof, given as a non-limiting example and made with reference to the single appended FIGURE illustrating the acquisition of shifted interferograms.

According to a first aspect, the invention relates to a method for calibrating a detection array used for acquiring an image of an interferogram, the interferogram being elaborated by a measuring instrument, for example by a static interferometer with echelettes.

A non-limiting exemplary application of the invention is that of interferometry for obtaining a spectrum in the infrared. For example, the subject is monitoring atmospheric pollution, notably via obtaining concentration profiles of ozone and carbon monoxide. Two narrow spectral bands are then particularly targeted: the band $B1=[1020\ cm-1, 1080\ cm-1]$ for ozone and the band $B2=[2132\ cm-1, 2192\ cm-1]$ for carbon monoxide.

Generally, and taking the example of an interferometer with echelettes, the invention proposes for each echelette, acquisition of three points (at the very least) spaced out approximately regularly with which the sine oscillation may be traced back, and the average value of the signal may then be found. Indeed, by varying the optical path difference, one locally moves on a sine wave portion: the interferometric signal actually varies in a quasi-sinusoidal way when the optical path difference is varied, and this all the more accurately since the input spectrum of the instrument is a narrow band spectrum. The oscillation period of the interferometric signal depending on the optical path difference is then close to the central wavelength of the narrow band spectrum. By interpolating the acquired points with a function, it is then possible to calculate a calibration coefficient corresponding to the echelette and which may be applied to the detection array in order to correct interpixel gain deviations.

Thus with the method according to the first aspect of the invention a calibration coefficient may be calculated for each echelette and the calibration coefficient of each superpixel of the detection array may be determined.

A possible application of the method according to the first aspect of the invention is described hereafter more specifically.

According to a first step, a first interferogram and at least two shifted interferograms are elaborated.

The first interferogram is elaborated by creating a finite number of optical path differences (each optical path difference corresponding to one echelette of the interferometer), while the shifted interferograms are successively elaborated (in time), for each of them, by shifting each of the optical path differences of the first interferogram by a known distance.

Considering for each optical difference, at least three points, notably at least three points relatively regularly spaced out along an interferometric oscillation period, at least three samples placed on a sine wave portion (as they are placed along the sinusoidal oscillation of the interferometric signal) are then available for each optical path difference.

It will retain that there is no constraint to regularly spacing out the three points; what is important is that the distance between the points is known. However the optimum consists in relatively regular spacing between the points. If two points are too close, they risk no longer providing sufficient information for solving the system of equations, which will be discussed subsequently.

Advantageously, the three samples correspond to optical path differences distant by one wavelength of the spectrum at the input of the instrument (4.63 µm all in all in the case of band B2, i.e. lambda/2 between each point). A total shift of the order of magnitude of one period (of therefore lambda), between the first and last sample is preferred since this provides a better estimation of the sought parameters. But such a shift is not indispensable. On the other hand, a too small total shift (less than lambda/4 for example) may lead to poor estimation of the interpixel gains. A shift larger than lambda should for each value be appreciated modulo lambda.

According to a preferential application of the invention retained in the following of the description, four shifted interferograms are elaborated in order to have four interferogram samples per echelette.

An interferogram I is defined in the following way, wherein $$I(x) = \sum_{\sigma} B(\sigma) \cdot S_F(\sigma) \cdot (1 + \cos(2\pi\sigma \cdot x))$$

B is the input spectrum of the instrument (it for example corresponds to the atmospheric spectrum measured by the instrument), in W/m²/sr/cm⁻¹;

$S_F$ is the filter of the instrument, it corresponds to the narrow filter in the simulations. It defines the spectral measuring domain of the invention. It is the presence of this narrow filter which makes the signal sinusoidal according to a change in the optical path difference of the order of magnitude of the wavelength.

x is the optical path difference (DDM), in cm;
$\sigma$ is the wave number in cm$^{-1}$.

The four sampled interferograms at the following optical path differences are noted as $I_1$, $I_2$, $I_3$ and $I_4$, in accordance with the first step of the method according to the first aspect of the invention.

For $I_1$, x=DDM$_1$=[−0.13 cm: 80 µm: +8.06 cm]; the optical path differences are sampled with an average step of 80 µm between −0.13 cm and +8.06 cm.

For $I_2$, x=DDM$_2$=DDM$_1$+2.31 µm;
For $I_3$, x=DDM$_3$=DDM$_1$+4.05 µm;
For $I_4$, x=DDM$_4$=DDM$_1$+6.36 µm.

It will be noted that these values are not perfectly regular in this example, notably because of other independent instrumental constraints (two spectral bands are acquired by the instrument).

For each interferogram, 1024 values are available. Let us note that i=1→1024.

It will be noted that because of errors in producing the echelettes, sampling is not perfectly regular. Typically a production error of the white noise type is considered with an amplitude of ±5 µm.

Following this first step, for each optical path difference, at least three samples are available, placed on a sine wave portion. Taking up the example shown here, for each echelette i (corresponding to an optical path difference xi) four regularly spaced-out points are thus considered, allowing acquisition of four samples I1(xi)1, I2(xi), I3(xi), and I4(xi), positioned on a sine wave portion.

The acquisition of these samples is illustrated in FIG. 1 for an echelette i and an echelette i+k, respectively.

The samples corresponding to the echelette i thus correspond to optical path differences DDM1(i), DDM2(i)=DDM1(i)+2.31 µm, DDM3(i)=DDM2(i)+1.74 µm and DDM4(i)=DDM3(i)+2.31 µm.

The samples corresponding to the echelette i+k, as for them, correspond to the optical path differences DDM1(i+k), DDM2(i+k)=DDM1(i+k)+1.74 µm, DDM3(i+k)=DDM2(i+k)+2.3 1 µm and DDM4(i+k)=DDM3(i+k)+2.31 µm, with DDM1(i+k)=DDM1(i)+k.Te+alpha(k) wherein Te represents the average sampling step (80 µm in the relevant example here) and alpha(k) is the (known) regularity error of the sampling step.

As the interferometric signal varies in a quasi-sinusoidal way when the optical path difference is varied, the four samples acquired for an echelette, are positioned on a sine wave portion as this is illustrated in FIG. 1.

When working on a narrow spectral band centered around a number $\sigma 0$, the spectrum seen by the instrument may then be written as the convolution product between a narrow function (which is the narrow spectrum shifted to 0) centered on 0 and a Dirac distribution centered on $\sigma_0$:

$$S(\sigma) = B(\sigma) \cdot S_F(\sigma)$$
$$= B(\sigma) \cdot {}^*S_0(\sigma) \otimes \partial(\sigma - \sigma_0)$$
$$= C(\sigma) \otimes \partial(\sigma - \sigma_0)$$

Now the interferogram is the Fourier cosine transform of the spectrum seen by the instrument $$I(x) = TF\cos[C(\sigma) \otimes \partial(\sigma - \sigma_0)]$$
$$= TF\cos[C(\sigma)]^* TF\cos(\partial(\sigma - \sigma_0))$$
$$= TF\cos[C(\sigma)]^* \cos(2\pi\sigma_0 x)$$

The interferogram is therefore locally the product of a cosine function of period σ0 and of a function which is the inverse of a narrow function, therefore a function which varies slowly versus x.

The interferogram may therefore be locally interpolated by a sine function. It is then considered that the slowly variable function is constant over this interval.

If the intention is to refine the evaluation (notably in the case of a wider band spectrum), the slowly variable function may be approximated by a polynomial of adequate order (in practice, 1 to 2 is sufficient).

We detail hereafter the case when the slowly variable function is considered as constant.

During a second step, the parameters of a function (typically a sinusoidal function) coinciding with each sine wave portion are determined by interpolation.

For example the following sinusoidal function is defined:

$$F(x_i) = M_i + C_i \cdot \cos(2\pi\sigma_i' x_i); \text{ wherein}$$

$M_i$ corresponds to the average level of the function;
$C_i$ corresponds to the contrast;
$\sigma_i'$ is the wave number in $cm^{-1}$;
i corresponds to the echelette;
$x_i$ is the optical path difference (DDM).

Consequently, for each echelette i, parameters of the function F (Mi, Ci and $\sigma_i'$) are sought such that $F(x_i) = I(x_i)$ and this for the four elaborated interferograms.

The parameters are for example obtained by applying the least squares algorithm in order to minimize the deviation $\|F(x_i) - I(x_i)\|^2$.

It will be retained that, within the scope of this preferential alternative, four equations are available for determining three unknowns. Let us note that it is possible to represent the slowly variable function by a polynomial of order 1 (a slope) in order to improve the calculation, the function F being then defined by: $F(xi) = [Mi + Ci \cdot \cos(2\pi\sigma i' xi)]^* pi^*(xi - x1)$. Four equations are then available for determining 4 unknowns.

Finally, for each echelette i, (I1(i), I2(i), I3(i), I4(i)), the unknowns Mi, Ci and σi' are obtained from the four interferogram values.

During a third step, a calibration coefficient is determined for an optical difference by using the parameters of the function coinciding with the sine wave portion corresponding to this optical path difference.

The calibration coefficient corresponding to an optical path difference for example is the average of this function.

Returning to the example of the interpolation by the sinusoidal function F shown above, the calibration coefficient for the optical path difference i thus corresponds to the parameter Mi.

The Applicant evaluated the deviation between the initial interferogram Ij and the interferogram calculated by interpolation Icj, and this for each optical path difference $x_i$.

$$Ic1(x_i) = F(x_i = DDM_1(i)) = Mi + C_i \cdot \cos(2\pi\sigma_i' x_i)$$

$$Ic2(x_i) = F(x_i = DDM_2(i)) = Mi + C_i \cdot \cos(2\pi\sigma_i' x_i)$$

$$Ic3(x_i) = F(x_i = DDM_3(i)) = Mi + C_i \cdot \cos(2\pi\sigma_i' x_i)$$

$$Ic4(x_i) = F(x_i = DDM_4(i)) = Mi + C_i \cdot \cos(2\pi\sigma_i' x_i)$$

The Applicant was able to notice that the signal-to-noise ratio (the noise corresponding to the standard deviation of the difference between initial interferograms and calculated interferograms) is larger than the specification in effect in the field of application of the invention.

Performance deviations are however noted for small optical path differences (typically echelettes 1 to 67) where interferometric contrast is significant. Thus, by taking into account these first echelettes, the signal-to-noise ratio of the interferogram is reduced by a factor of 8. The Applicant was thus able to evaluate that the noise on echelette 67 is about 500 times larger than for echelette 601. It is possible to improve (when this is necessary) the result by taking into account a function of higher order for the function TF cos [C(σ)].

The results on the other hand are particularly good on 95% of the interferogram (for larger optical path differences, typically echelettes 68 to 1024). On an interferogram without any noise, with the method according to the first aspect of the invention, it is thus possible to know the gain variations of the detection array for echelettes 68 to 1024 with an accuracy of 0.003%.

Once the calibration of the detection array is achieved (by calculating the calibration coefficients for the whole of the echelettes), during the elaboration of a new interferogram, the interferogram image acquired by the detection array will be corrected by means of said calibration coefficients (more specifically, each of the superpixels of the array corresponding to an echelette will be corrected with the calibration coefficient associated with this echelette calculated during calibration).

During the first step of the method according to the invention, acquisition of a first interferogram and of at least two shifted interferograms is achieved, each of the shifted interferograms corresponding to samples shifted by a given amount relatively to the samples of the first interferogram.

According to a possible embodiment of the invention, a mobile component of the measuring instrument is displaced in order to elaborate a shifted interferogram.

In order to generate a known signal variation for each (super)pixel of the detection array and to thereby elaborate a shifted interferogram, it is possible to slightly vary the optical path difference on one of the two arms of the interferometer, by positioning one of the mirrors of the interferometer on a piezo-mechanism.

Alternatively, a slow inclinatory movement (tilt movement) or a slow translational movement of a glass plate (prismed in the case of a translation) possibly offset in an arm of the interferometer. This glass plate may be the compensating biplate of the interferometer. With this it is possible to obtain a mechanically very pure movement with a displacement device based on piezo-electricity.

It will be noted that the invention is not limited to a method according to its first aspect, but also extends to a measuring instrument comprising a detection array for acquiring an image of an interferogram, calibrated in accordance with the method according to the first aspect of the invention.

The advantages of the invention relatively to what exists are notably the following:

calibration may be achieved in a flight-borne instrument (for example an interferometer on board a satellite)

increased reliability of the calibration very good accuracy, no external element (black mask) is required, and the whole instrument chain is taken into account possible phase modulation (for spectrometers acquiring a narrow band)

in the case of a static Fourier transform spectrometer with echelettes, the calibration may be directly achieved on the observed scene.

As such, a piezo-electric device proves to be more reliable than a device with a removable mask which will be alternately inserted on both routes of the interferometer in order to obturate it. Such a device with a removable mask actually has two a priori bulky mechanisms. Moreover, the inserted masks may themselves have defects if there are not perfectly black. It will be further noted that in thermal infrared, these masks would emit light, which would not make any calibration possible. Finally, within the scope of an operational use, such a device with a removable mask would have significant criticality and loss of the mission in the case of a failure in the obturated position.

A component-by-component calibration as for it has the drawback of only being able to be achieved upon assembly. Next, tracking this calibration with a partial device (only illuminating the array for example) would allow part of the changes to be taken into account. But with this device, it is therefore not possible to take into account all the changes which are likely to happen during the lifetime of the instrument (dusts being deposited at the input of the instrument for example).

In the case of calibration on an on-board black body (or <<white integrating>> sphere), the uniformity of the illumination is modified by the interferences, when the latter originate from a known scene (the black body) and it is therefore possible to calibrate the defects of the detector from this known scene in the absence of its being uniform. However, this system is inevitably present on an annex route of the interferometer. It therefore has defects which are not present on the measuring route of the interferometer (dusts . . . ); conversely, it does not pass through all the elements of the interferometer (input mirror . . . ) and therefore does not calibrate all the defects. Finally, this system requires perfect knowledge of the spectral profile of the illumination source and its uniformity which cannot be better than a few percent. Now, a calibration typically of the order of 0.1% is desired.

The invention claimed is:

1. A method for elaborating an interferogram at an instrument, where the instrument having an input spectrum, comprising the steps of:
    determining the gain variations among pixels of a detection array of the instrument according to the steps of:
        elaborating a first interferogram by creating a finite number of optical path differences, and elaborating at least two shifted interferograms by shifting each of the optical path differences of the first interferogram, where each optical path difference having at least three samples positioned on a sine wave portion;
        determining, for each sine wave portion, a function coinciding with the sine wave portion by interpolation;
        determining a calibration coefficient for each optical path difference from the function coinciding with the sine wave portion corresponding to this optical path difference;
    detecting an image of the first interferogram by the detection array of the instrument; and
    producing a corrected image of the first interferogram, which producing comprises using said calibration coefficients to correct the image of the first interferogram to thereby reduce the effects of errors caused by gain variations among the pixels of the detection array.

2. The method according to claim 1, wherein the calibration coefficient corresponds to the average of the function.

3. The method according to claim 1, wherein the function is sinusoidal.

4. The method according to claim 1, wherein the function corresponds to the product of a sinusoidal function and of a polynomial function.

5. The method according to claim 1, wherein said at least three samples correspond to regularly spaced-out optical path differences.

6. The method according to claim 1, wherein said at least three samples correspond to optical path differences spaced out so as to have a total shift larger than the quarter of a wavelength of the input spectrum of the instrument elaborating the interferograms.

7. The method according to claim 6, wherein said at least three samples correspond to optical path differences spaced out so as to have a total shift of one wavelength of the spectrum at the input of the instrument.

8. The method according to claim 1, further comprises elaborating three shifted interferograms.

9. The method according to claim 1, wherein elaborating a shifted interferogram further comprises displacing a mobile component of the instrument.

10. The method according to claim 9, wherein the mobile component is mounted on a piezo-electric mechanism.

11. The method according to claim 1, wherein the input spectrum of the instrument elaborating the interferograms is with a narrow band.

12. The method of claim 1, wherein producing the corrected image of the first interferogram comprises correcting a response of the pixels of the detection array corresponding to an optical path difference with the calibration coefficient associated with this optical path difference.

* * * * *